(12) United States Patent
Coker et al.

(10) Patent No.: US 9,726,087 B2
(45) Date of Patent: Aug. 8, 2017

(54) FLAPPER ASSEMBLY FOR A THROTTLE VALVE

(71) Applicant: Norgren GT Development Corporation, Auburn, WA (US)

(72) Inventors: Adam Coker, Whiteland, IN (US); Mark Sealy, Warwickshire (GB); William Benjamin Boult, Cornwall (GB); John Michael Morris, Auburn, WA (US)

(73) Assignee: Norgren GT Development Corporation, Auburn, WA (US)

( * ) Notice: Subject to any disclaimer, the term of this patent is extended or adjusted under 35 U.S.C. 154(b) by 0 days.

(21) Appl. No.: 14/647,413

(22) PCT Filed: Nov. 25, 2013

(86) PCT No.: PCT/US2013/071686
§ 371 (c)(1),
(2) Date: May 26, 2015

(87) PCT Pub. No.: WO2014/085326
PCT Pub. Date: Jun. 5, 2014

(65) Prior Publication Data
US 2015/0315985 A1     Nov. 5, 2015

Related U.S. Application Data

(60) Provisional application No. 61/731,280, filed on Nov. 29, 2012.

(51) Int. Cl.
*F16K 1/22* (2006.01)
*F02D 9/10* (2006.01)

(52) U.S. Cl.
CPC ........... *F02D 9/1005* (2013.01); *F02D 9/107* (2013.01); *F16K 1/22* (2013.01); *Y10T 29/49417* (2015.01)

(58) Field of Classification Search
USPC ........................................ 29/890.13; 251/289
See application file for complete search history.

(56) References Cited

U.S. PATENT DOCUMENTS

| 1,841,695 A | 1/1932 | Anderson | |
| 3,066,631 A * | 12/1962 | Geary | B21D 53/86 29/416 |
| 3,501,928 A | 3/1970 | Pitner | |
| 4,232,709 A * | 11/1980 | Zoric | F16K 11/0873 137/625.47 |

(Continued)

FOREIGN PATENT DOCUMENTS

| JP | 554122212 U | 8/1979 |
| JP | S62108668 U | 7/1987 |

(Continued)

*Primary Examiner* — John Fox
(74) *Attorney, Agent, or Firm* — The Ollila Law Group LLC

(57) ABSTRACT

A method of forming a flapper assembly (200) for a throttle valve (100) is provided. The method includes steps of forming a flapper (110) comprised of hub (112) having an opening (114) and at least one vane (116*a,b*) coupled to the hub (112), disposing a shaft (210) in the opening (114), and pressing a punch (P) into an outer surface (112*a*) of the hub (112) such that a torque dimple (118) extends from the hub (112) into the shaft (210) to fasten the flapper (110) to the shaft (210).

14 Claims, 3 Drawing Sheets

(56) References Cited

U.S. PATENT DOCUMENTS

| | | | | |
|---|---|---|---|---|
| 4,281,632 A | * | 8/1981 | Fenn | F02D 9/1015 |
| | | | | 123/590 |
| 4,611,374 A | * | 9/1986 | Schnelle | B23P 11/005 |
| | | | | 137/515.5 |
| 5,168,901 A | * | 12/1992 | Marks | A61M 5/16827 |
| | | | | 137/884 |
| 5,277,216 A | * | 1/1994 | Horton | F16K 1/221 |
| | | | | 137/15.25 |

FOREIGN PATENT DOCUMENTS

| | | | |
|---|---|---|---|
| JP | H0614636 | * | 2/1994 |
| JP | H0614636 U | | 2/1994 |
| JP | 201287876 | * | 5/2012 |
| JP | 201287876 A | | 5/2012 |

\* cited by examiner

FLAPPER ASSEMBLY FOR A THROTTLE VALVE

CROSS-REFERENCE TO RELATED APPLICATIONS

This is a National Stage entry of International Application No. PCT/US2013/071686, with an international filing date of Nov. 25, 2013, entitled "A FLAPPER ASSEMBLY FOR A THROTTLE VALVE" which claims priority of U.S. provisional patent application No. 61/731,280, filed Nov. 29, 2012 and entitled "A METHOD OF ATTACHING A HIGH TORQUE ROTATING VALVE."

TECHNICAL FIELD

The embodiments described below relate to valves and, more particularly, to flapper assemblies for throttle valves.

BACKGROUND

Valves, such as throttle valves, are often employed to regulate fluid flow streams in engines. Engines inherently vibrate and subject the throttle valves to varying thermal loads. Some engines, such as diesel engines being designed for forthcoming regulatory standards, can subject the flapper assembly to considerable forces thereby causing a large torque on the rotatable shaft. These environmental factors can be problematic for the valves.

Typically, the valves have small parts, such as screws, to fasten fluid control surfaces to valve bodies. These small parts can be in the flow stream. For example, butterfly valves typically have a flapper assembly that is disposed in a valve body. The flapper assembly is usually comprised of two vanes that are coupled, directly or indirectly, to a rotatable shaft in the valve body with fasteners. The vanes and shaft and, therefore, the screws are in the flow stream. Other configurations of the control surfaces, such as a flapper configuration where the shaft is offset from the center of the valve, also have fasteners in the flow stream.

The engine's vibration, varying thermal loads, and large torque can cause the fasteners to loosen over time, even if securely fastened. As a result, the fasteners can enter the flow stream and fall into the engine causing catastrophic damage. For example, if a screw falls through an intake manifold on an engine, it could enter an engine cylinder with an intake and exhaust poppet valves. The screw could, in one failure mode, cause the poppet valves to lodge open in chamber. A piston in the cylinder could then stroke towards the poppet valve to compress air-fuel mixture. However, instead of compressing the air-fuel mixture, the piston strikes the poppet valve that is lodged open by the screw. This will destroy the piston which in turn causes a catastrophic failure of the engine.

Therefore, each loose part in the fluid flow has a potential high associated cost. Fasteners can be improved so they are not prone to loosen due to the environmental factors. However, designing fasteners for the vibration, thermal loads, and high torque is expensive due to the low volume of such fasteners. Eliminating parts from the throttle valve can therefore eliminate the associated high cost of each failure mode as well as the high costs of specially designed fasteners.

Accordingly, there is a need to eliminate fasteners from the throttle valves. There is also a need to eliminate fasteners from the flapper assemblies.

SUMMARY

A method of forming a flapper assembly for a throttle valve is provided. According to an embodiment, the method comprises forming a flapper comprised of hub having an opening and at least one vane coupled to the hub, disposing a shaft in the opening. The method further comprises pressing a punch into an outer surface of the hub such that a torque dimple extends from the hub into the shaft to fasten the flapper to the shaft.

A flapper assembly for a throttle valve is provided. According to an embodiment, the flapper assembly is comprised of a flapper comprised of hub having an opening and at least one vane coupled to the hub and a shaft disposed in the opening. The flapper assembly further comprises at least one torque dimple in the hub that extends into the shaft to fasten the flapper to the shaft.

A method of forming a throttle valve is provided. According to an embodiment, the method comprises forming a flapper comprised of hub having an opening and at least one vane coupled to the hub, forming and adapting a housing with an aperture to channel a flow stream through the housing, forming and disposing a shaft in the opening of the flapper and coupling the shaft to the housing such that the flapper is disposed in the aperture to regulate the flow stream through the housing, and pressing a punch into an outer surface of the hub such that a torque dimple extends from the hub into the shaft to fasten the flapper to the shaft.

ASPECTS

According to an aspect, a method of forming a flapper assembly (200) for a throttle valve (100) comprises forming a flapper (110) comprised of hub (112) having an opening (114) and at least one vane (116a,b) coupled to the hub (112), disposing a shaft (210) in the opening (114), and pressing a punch (P) into an outer surface (112a) of the hub (112) such that a torque dimple (118) extends from the hub (112) into the shaft (210) to fasten the flapper (110) to the shaft (210).

Preferably, the method of forming the flapper assembly (200) further comprises a step of pressing a plurality of the punches (P) into the outer surface (112a) of the hub (112) such that a plurality of the torque dimples (118).

Preferably, the step of forming the flapper (110) comprises steps of forming a flapper blank (110") comprised of the hub (112) having the opening (114) and at least one vane blank (116), and cutting through the flapper blank (110") to form a flapper edge (110a).

Preferably, the step of forming the flapper (110) is comprised of forming and coupling a first vane (116a) and a second vane (116b) to mutually opposing sides of the hub (112).

According to another aspect, a flapper assembly (200) for a throttle valve (100) comprises a flapper (110) comprised of hub (112) having an opening (114) and at least one vane (116a,b) coupled to the hub (112), a shaft (210) disposed in the opening (114), and at least one torque dimple (118) in the hub (112) that extends into the shaft (210) to fasten the flapper (110) to the shaft (210).

Preferably, the flapper assembly (200) further comprises a plurality of the torque dimples (118) in the hub (112) that extend into the shaft (210) to fasten the flapper (110) to the shaft (210).

Preferably, the at least one vane (116a,b) comprises a first vane (116a) and a second vane (116b) coupled to mutually opposing sides of the hub (112).

According to another aspect, a method of forming a throttle valve (100) comprises forming a flapper (110) comprised of hub (112) having an opening (114) and at least one vane (116) coupled to the hub (112), forming and adapting a housing (120) with an aperture (122) to channel a flow stream through the housing (110), forming and disposing a shaft (210) in the opening (114) of the flapper (110) and coupling the shaft (210) to the housing (120) such that the flapper (110) is disposed in the aperture (122) to regulate the flow stream through the housing (110), and pressing a punch (P) into an outer surface (112a) of the hub (112) such that a torque dimple (118) extends from the hub (112) into the shaft (210) to fasten the flapper (110) to the shaft (210).

Preferably, the method of the method of forming the throttle valve (100) further comprises forming and coupling a first vane (116a) and a second vane (116b) to mutually opposing sides of the hub (112).

Preferably, the method of forming the throttle valve (100) further comprises pressing a plurality of the punches (P) into the outer surface of the hub (112) such that a plurality of the torque dimples (118) extend from the hub (112) into the shaft (210).

Preferably, the method of forming the inlet throttle (100) further comprises coupling two actuators (130a,b) to mutually opposing sides of the housing (120) and the shaft (210).

BRIEF DESCRIPTION OF THE DRAWINGS

The same reference number represents the same element on all drawings. It should be understood that the drawings are not necessarily to scale.

DETAILED DESCRIPTION

Figure 1:
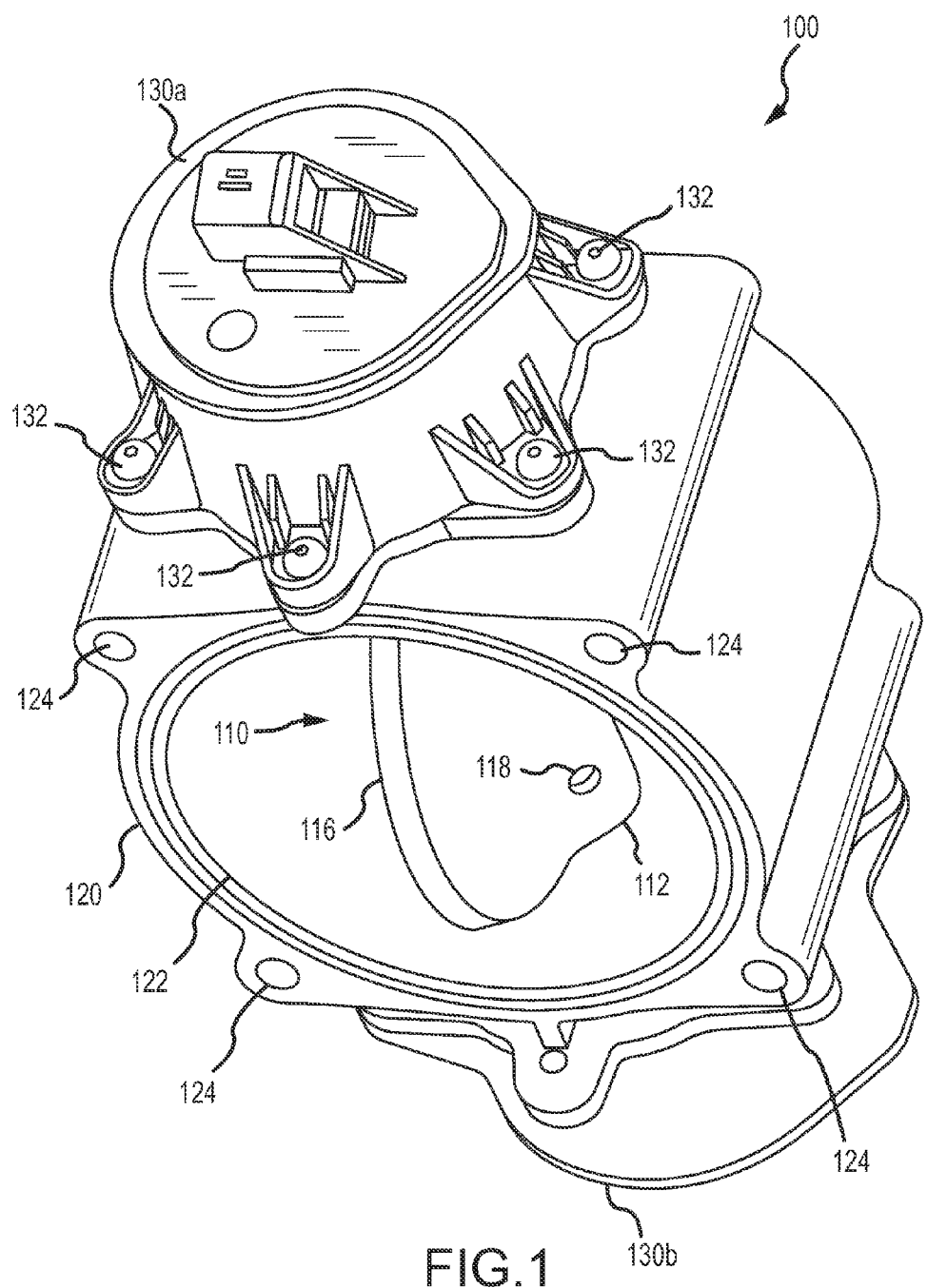
FIG. 1 shows a perspective view of a throttle valve 100 with a flapper assembly according to an embodiment.
Figure 2A:
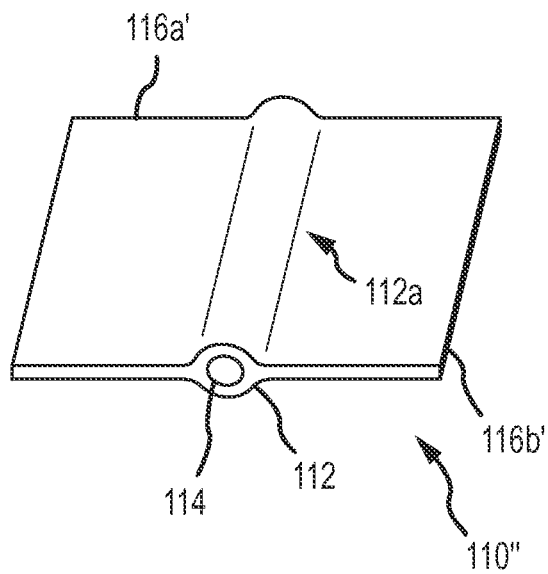
FIGS. 2a-2d show views of a method of forming a flapper assembly 200 according to an embodiment.
Figure 2B:
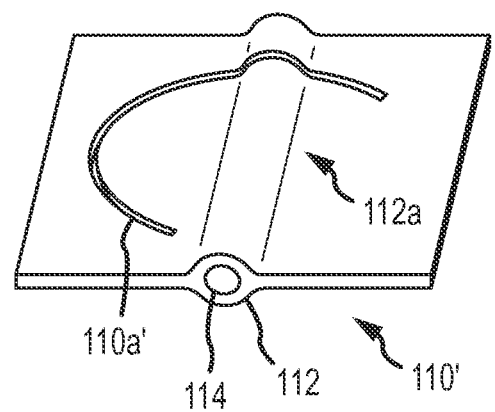
Figure 2C:
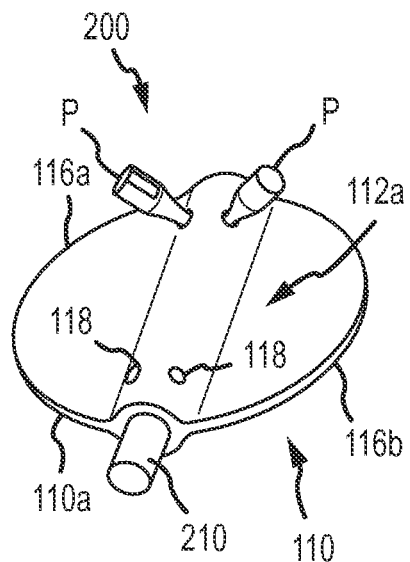
Figure 2D:
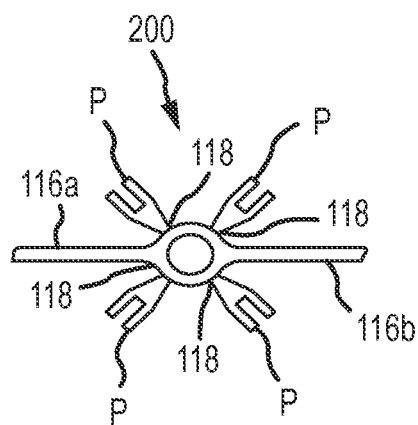

FIGS. 1-2d and the following description depict specific examples to teach those skilled in the art how to make and use the best mode of embodiments of a flapper assembly for a throttle valve. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the flapper assembly for the throttle valve. As a result, the embodiments described below are not limited to the specific examples described below, but only by the claims and their equivalents.

FIG. 1 shows a perspective view of a throttle valve 100 with a flapper assembly according to an embodiment. The throttle valve 100 can be coupled to an intake manifold on an engine (not shown) to regulate a flow stream going into the engine. The throttle valve 100 includes a flapper 110 with a hub 112 having an opening 114 and at least one vane 116 coupled to the hub 112. The housing 120 includes an aperture 122 to channel a flow stream through the housing 110. Two torque dimples 118 are shown. Also, show are actuators 130a,b coupled to the flapper 110. The actuators 130 can rotate the flapper 110. The two actuators 130a,b can be coupled to the flapper 110 via a shaft. A punch can press into an outer surface 112a of the hub 112 to form the torque dimples 118 that extend from the hub 112 into the shaft described in more detail, along with the flapper assembly, with reference to FIGS. 2a-2d.

With reference to FIG. 1, the flapper 110 is shown as disposed in the aperture 122 and rotatably coupled to the housing 120. The flapper 110 is adapted to rotate about a rotation axis in the housing 120 to regulate the flow stream flowing through the aperture 122 to the engine. For example, as shown, the 110 is rotated to be parallel to a direction of the flow stream. In this position the flow stream can be a maximum. The flapper 110 can rotate to a position that is perpendicular to the flow stream. In the perpendicular position, the flow stream is at or near a minimum flow rate. While the flapper 110 is rotating, the flow stream can exert considerable amount of forces on the flapper 110. These forces can cause a torque about the rotation axis of the flapper 110. Although the flapper 110 is shown with a circular shape and vanes 116 that are coupled to the hub 112 in an integral manner (e.g., the hub 112 and vanes 116 are formed at the same time), alternative shapes and arrangements can be employed in alternative embodiments. For example, the flapper 110 can be oval shaped with a square hub. Additionally or alternatively, the vanes 116a,b can be a discrete parts that are coupled to the hub 112 rather than formed integrally with the flapper 110.

The hub 112 has a cylindrical shape that coupled to the vanes 116 in an integral manner. As shown, the hub 112 is coupled to the vane 116 with a smooth curve. The smooth curve can reduce the turbulence caused by the flapper 110. However, in alternative embodiments, the hub 112 can be a discrete part that is not coupled to the vanes 116 with a smooth curve. The vane 116 is shaped to fit in the aperture 122. For example, a space between the vane 116 and the aperture 122 can be minimized to reduce the flow stream flow rate when the flapper 110 is in the perpendicular position. However, in alternative embodiments, it may be desirable for the vane 116 to not be shaped to fit in the aperture 122. As discussed in the foregoing, rotation of the flapper 110 causes considerable torques to form about the rotation axis of the flapper 110. The fastening dimples 118 are adapted to fasten and hold the flapper 110 to the shaft, even when the flapper 110 experiences the torques caused by the flow stream, as will be described in more detail in the following.

FIGS. 2a-2d show views of a method of forming a flapper assembly 200 according to an embodiment. FIG. 2a shows a perspective view of a flapper blank 110" comprised of the hub 112 having an opening 114 and two vane blanks 116a,b'. FIG. 2b shows a perspective view of an intermediate flapper blank 110' that is comprised of the flapper blank 110" with partial edge cutout 110a'. FIG. 2c shows perspective view of the flapper 110 with two punches P pressing into the outer surface 112a of the hub 112 such that a torque dimple 118 extends from the hub 112 into the shaft 210 to fasten the flapper 110 to the shaft 210. FIG. 2d shows a side view of the flapper 110 with four punches P pressing into the outer surface 112a of the hub 112 such that four shown torque dimples 118 extend from the hub 112 into the shaft 210 to fasten the flapper 110 to the shaft 210.

The torque dimple 118 extending into the shaft 210 fastens the flapper 110 to the shaft 210. The torque dimple 118 can also hold the flapper 110 to the shaft 210 even when the flapper 110 is subject to the flow stream torque. The torque dimple 118 and corresponding punch 220 are shown as having a cone shape although any shape may be employed. For example, in alternative embodiments, the punch P can form a linear shaped groove oriented in a direction that is perpendicular to the direction of the flow stream torque. To form a linear shaped groove, the punch P could have a linear shape end. Alternatively, instead of the punch, other methods of pressing material from the hub 112 into the shaft 210 can be employed. Also, although only the torque dimple 118 is shown to fasten the flapper 110 to the shaft 210, supplementary adhesion means may be employed in alternative embodiments. For example, the flapper 110 or shaft 210 can have knurling, honing, or other surface preparations. Additionally or alternatively, coatings can also be employed. The flapper assembly 100 can be formed by a method discussed in more detail in the following.

The method shown in FIGS. 2a-2d can include steps of forming the flapper 110 comprised of the hub 112 and an opening 114 and at least one vane 116a,b. The step of forming the flapper can also include coupling the vane 116a,b to the hub 112. Additionally, the method can also include pressing at least one punch P into the outer surface 112a of the hub 112 such that a torque dimple 118 extends from the hub 112 into the shaft 210 to fasten the flapper 110 to the shaft 210. A plurality of punches P forming a plurality of dimples 118 can also be used. For example, as shown in FIGS. 2a-2d, the method of forming a flapper assembly 200 includes pressing two punches P into the outer surface 112a of the hub 112 to form four of the torque dimples 118 that extend from the hub 112 into the shaft 210. Although two punches P and four torque dimples 118 are shown, more or fewer punches P and torque dimples 118 may be employed. When the punch P pressed into the hub 112, the torque dimple 118 extends into the shaft 210. That is, the punch P presses material from the hub 112 into the shaft 210.

The method of forming the flapper assembly 200 can also include steps of forming the flapper blank 110" and an intermediate flapper blank 110'. Forming the flapper blank 110' can include forming the hub 112 having the opening 114 and at least one vane blank 116. Forming the intermediate flapper blank 110' can include cutting through the flapper blank 110" to form a flapper edge 110a. The method of forming the flapper assembly 200 can also include steps of forming and coupling a first vane 116a and a second vane 116b to mutually opposing sides of the hub 112.

As discussed in the foregoing, supplementary adhesion means can be used with the torque dimple 118 to fasten the flapper 110 to the shaft 210. The supplementary adhesion means can be provided by depositing a coating on the shaft 210 or in the hub 112. The flapper 110 and the shaft 210 can also be formed from materials selected to promote galvanic corrosion. Surface features such as knurling or honing can be formed in the flapper 110 or the shaft 210. Other methods of providing supplementary adhesion may be employed.

The throttle assembly 200 can be used to form the throttle valve 100. A method of forming the throttle valve 100 can include steps of forming the flapper 110, the housing 120 with the aperture 122, disposing the shaft 210 in the opening 114 of the flapper 110, and coupling the shaft 210 to the housing 120. The method can also include pressing a punch P into the outer surface 112a of the hub 112 such that a torque dimple 118 extends from the hub 112 into the shaft 210 to fasten the flapper 110 to the shaft 210. The foregoing steps are not in any particular order. For example, the shaft 210 can be disposed in the opening 114 after the shaft 210 is coupled to the housing 120. The punch P can also press into the outer surface 112a of the hub 112 before the shaft 210 is coupled to the housing 120.

The step of forming the flapper 110 can include forming the hub 112 having an opening 114 and at least one vane 116 coupled to the hub 112. The step of forming the housing 120 can include adapting the housing 122 with the aperture 122 to channel a flow stream through the housing 110. The shaft 210 can be coupled to the housing 120 such that the flapper 110 is disposed in the aperture 122 to regulate the flow stream through the housing 110.

The method of forming the throttle valve 100 can further include additional steps. For example, the method can include a step of forming and coupling a first vane 116a and a second vane 116b to mutually opposing sides of the hub 112. The method can also include a step of pressing a plurality of the punches P into the outer surface of the hub 112 such that a plurality of the torque dimples 118 extend from the hub 112 into the shaft 210. Also, two actuators 130a,b can be coupled to mutually opposing sides of the housing 120 and the shaft 210. The actuators 130a,b can rotate the flapper 110 to regulate the flow stream through the housing 120. For example, the actuators 130a,b can rotate the flapper 110 from the position parallel with the flow stream to the position perpendicular to the flow stream.

The embodiments described above provide a flapper assembly 200 for a throttle valve 100. As explained, the throttle valve 100 can be used in high torque, vibration and thermal load environments. The flapper assembly 200 can be subjected to considerable torque due to the forces applied by the flow stream. These factors could cause screws or other fasteners in prior art flappers or throttle valves to loosen and falling into the flow stream. The flapper assembly 100 can prevent fasteners or other parts from entering the flow stream and, therefore, prevent engine failures. Accordingly, the potential high cost associated with the loose parts in the flow stream is eliminated. The throttle assembly 100 also does not require additional hardware thereby eliminating associated costs and weight. These benefits are realized without resorting the screws or fasteners specifically designed for the environmental factors.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other valves, and not just to the embodiments described above and shown in the accompanying figures. Accordingly, the scope of the embodiments described above should be determined from the following claims.

We claim:

1. A method of forming a flapper assembly (200) for a throttle valve (100), the method comprising steps of:
   forming a flapper (110) comprised of hub (112) having an opening (114) and at least one vane (116a,b) coupled to the hub (112);
   disposing a shaft (210) in the opening (114); and
   pressing a punch (P) into an outer surface (112a) of the hub (112) after the shaft (210) is disposed in the opening (114) such that a torque dimple (118) extends from the hub (112) into the shaft (210) to fasten the flapper (110) to the shaft (210).

2. The method of forming the flapper assembly (200) of claim 1 further comprising a step of pressing a plurality of the punches (P) into the outer surface (112a) of the hub (112) such that a plurality of the torque dimples (118).

3. The method of forming the flapper assembly (200) of claim 1, wherein the step of forming the flapper (110) comprises steps of:
    forming a flapper blank (110") comprised of the hub (112) having the opening (114) and at least one vane blank (116); and
    cutting through the flapper blank (110") to form a flapper edge (110a).

4. The method of forming the flapper assembly (200) of claim 1, wherein the step of forming the flapper (110) is comprised of forming and coupling a first vane (116a) and a second vane (116b) to mutually opposing sides of the hub (112).

5. The method of claim 1, wherein pressing the punch (P) into the outer surface (112a) of the hub (112) such that the torque dimple (118) extends from the hub (112) into the shaft (210) comprises the punch (P) pressing material from the hub (112) into the shaft (210).

6. A flapper assembly (200) for a throttle valve (100) comprised of:
    a flapper (110) comprised of hub (112) having an opening (114) and at least one vane (116a,b) coupled to the hub (112);
    a shaft (210) disposed in the opening (114); and
    at least one torque dimple (118) in the hub (112) that extends into the shaft (210) to fasten the flapper (110) to the shaft (210), said at least one torque dimple (118) being pressed by a punch (P) after the shaft (210) is disposed in the opening (114).

7. The flapper assembly (200) of claim 6 further comprising a plurality of the torque dimples (118) in the hub (112) that extend into the shaft (210) to fasten the flapper (110) to the shaft (210).

8. The flapper assembly (200) of claim 6, wherein the at least one vane (116a,b) comprises a first vane (116a) and a second vane (116b) to mutually opposing sides of the hub (112).

9. The flapper assembly (200) of claim 6, wherein the torque dimple (118) that extends from the hub (112) into the shaft (210) comprises material pressed by a punch (P) from the hub (112) into the shaft (210).

10. A method of forming a throttle valve (100), the method comprising
    forming a flapper (110) comprised of hub (112) having an opening (114) and at least one vane (116) coupled to the hub (112);
    forming and adapting a housing (120) with an aperture (122) to channel a flow stream through the housing (110);
    forming and disposing a shaft (210) in the opening (114) of the flapper (110) and coupling the shaft (210) to the housing (120) such that the flapper (110) is disposed in the aperture (122) to regulate the flow stream through the housing (110); and
    pressing a punch (P) into an outer surface (112a) of the hub (112) after the shaft (210) is disposed in the opening (114) such that a torque dimple (118) extends from the hub (112) into the shaft (210) to fasten the flapper (110) to the shaft (210).

11. The method of forming the throttle valve (100) of claim 10 further comprises forming and coupling a first vane (116a) and a second vane (116b) to mutually opposing sides of the hub (112).

12. The method of forming the throttle valve (100) of claim 10 further comprising pressing a plurality of the punches (P) into the outer surface of the hub (112) such that a plurality of the torque dimples (118) extend from the hub (112) into the shaft (210).

13. The method of forming the throttle valve (100) of claim 10 further comprising steps of coupling two actuators (130a,b) to mutually opposing sides of the housing (120) and the shaft (210).

14. The method of claim 10, wherein pressing the punch (P) into the outer surface (112a) of the hub (112) such that the torque dimple (118) extends from the hub (112) into the shaft (210) comprises the punch (P) pressing material from the hub (112) into the shaft (210).

* * * * *